United States Patent [19]

Bauer

[11] 4,161,187
[45] Jul. 17, 1979

[54] EROSION RESISTANT CONTROL VALVE

[76] Inventor: David N. Bauer, 8345 Pine Cir., Hobe Sound, Fla. 33455

[21] Appl. No.: 866,715

[22] Filed: Jan. 3, 1978

[51] Int. Cl.² .......................................... F16K 27/02
[52] U.S. Cl. ............................... 137/375; 29/157.1 R; 251/368
[58] Field of Search ................... 29/157.1 R; 137/375; 251/368

[56] References Cited

U.S. PATENT DOCUMENTS

| | | | |
|---|---|---|---|
| 891,975 | 6/1908 | Beaver | 137/375 |
| 904,852 | 11/1908 | Dwyer | 137/375 |
| 1,733,276 | 10/1929 | Porter | 137/527 |
| 2,716,421 | 8/1955 | Bertrand | 251/368 X |
| 2,792,845 | 5/1957 | Atherton et al. | 137/375 |
| 3,044,489 | 7/1962 | Raub et al. | 137/375 X |
| 3,059,667 | 10/1962 | Coceano | 251/368 X |
| 3,160,391 | 12/1964 | Medicus et al. | 251/368 X |
| 3,188,724 | 6/1965 | Bates et al. | 29/157.1 R |
| 3,480,037 | 11/1969 | Alexander | 251/368 X |
| 3,985,150 | 10/1976 | Kindersley | 137/375 X |
| 4,094,337 | 6/1978 | Robinson | 251/368 X |

*Primary Examiner*—Gerald A. Michalsky
*Attorney, Agent, or Firm*—Carroll F. Palmer

[57] ABSTRACT

A control valve for regulating flow of erosive fluids comprises an inlet at right angle to an outlet, a reciprocating valve plug and mating valve seat. The valve has an outer body made of stainless steel and an inner body composed of three sleeves formed of chromium carbide or tungsten carbide. The valve plug and seat are also formed of such carbide. A method for manufacture of the valves is disclosed.

4 Claims, 1 Drawing Figure

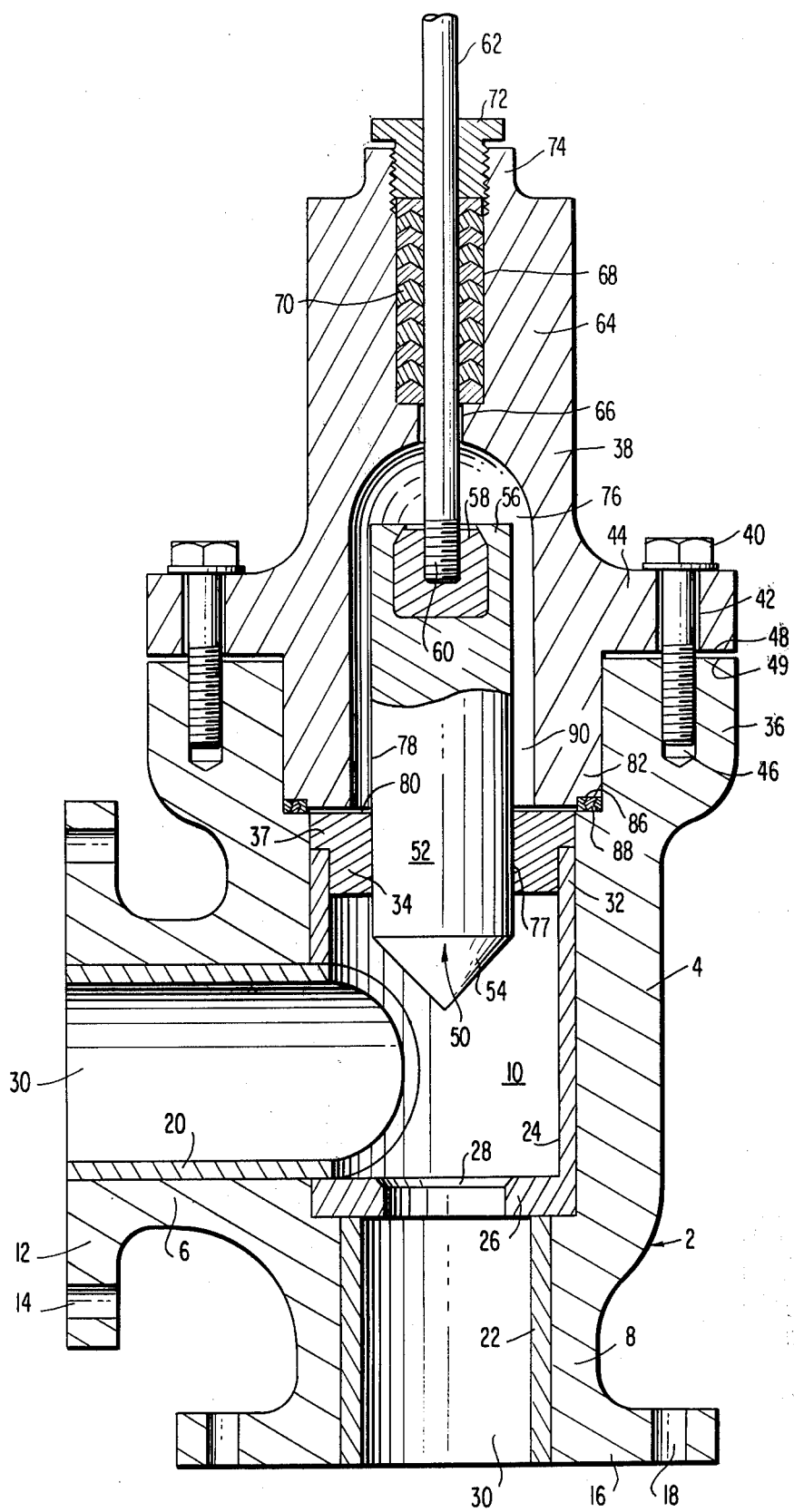

EROSION RESISTANT CONTROL VALVE

BACKGROUND OF THE INVENTION

1. Field of the Invention

This invention relates to control valves and a method for their manufacture. More particularly, it concerns angle-type valves designed for use in controlling flow of highly erosive fluids, e.g., hot pitch, so constructed as to withstand severe erosive action within the valve.

2. Description of the Prior Art

Hot pitch discharged from coke ovens contains fine particles of highly abrasive material. The flow of such pitch must be controlled by valves in the course of its handling which involves its flow at relatively great velocity at high temperatures. Such conditions can cause flashing and cavitation within a control valve that materially contribute to the action of the abrasive particles in producing rapid erosion of valves that have been available for controlling flow of hot pitch or similar erosive fluids.

The problem of attack of valve parts by action of fluids passing through the valves has been addressed by the prior art in various ways. One solution has been to form parts for plug-type valves of ceramic material, rather than metal, e.g., see U.S. Pat. Nos. 867,780; 885,526 and 925,809. Another approach has been to use ball-type valves provided with plastic coatings to reduce the attack by fluids being handled, e.g., see U.S. Pat. Nos. 3,073,336 and 3,825,030. A further development for protection of valves against abrasive action was the use of tubular inserts of boron carbide in ball type valves, e.g., see U.S. Pat. No. 3,985,150.

It has also been known to use tubular inserts of corrosion resistant material, such as carbon, to reduce corrosion of angle-type valves designed to control flow of acid, e.g., see U.S. Pat. No. 2,792,845.

In spite of the many advances made in valve construction to reduce corrosion or erosion problems, the need exists for further improvements in control valves for use in regulating flow of highly abrasive fluids, particularly when such fluids are handled at high temperatures and flow rates.

OBJECTS

A principal object of the invention is the provision of angle-type control valves capable of handling highly abrasive fluids for long periods of time without erosive failure.

Another object is the provision of valves useful in controlling flow of hot pitch under temperature and flow conditions that promote flashing and cavitation coupled with abrasive action capable of destroying prior known control valves in a very short time.

A further object is the provision of novel methods for the manufacture of erosion proof control valves of the angle-type.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

These objects are accomplished according to the present invention by constructing an erosion resistant, plug control valve of the angle-type with tubular sleeves formed of chrome carbide or tungsten carbide lining the flow passage through the valve plus a reciprocating valve plug also formed of such carbide. Erosion or breakage of the valve plug is mitigated by forming the plug as a solid cylinder with conical tip to engage a valve seat also formed of the carbide and having a cavity in the valve bonnet to provide a contained space in which the valve plug may move for flow control operation of the valve.

The objects are further accomplished by forming the control valve with an outer body of stainless steel, machining the carbide tubular sleeves with slightly larger O.D. than the I.D. of the inlet, outlet and central chamber portions of the valve body that the sleeves are to line, heating the outer body and the sleeves to an elevated temperature, e.g., 1000° F., at which the sleeves may be inserted into their respective body lining positions and then cooling the resulting assembly to ambient temperature thereby locking the sleeves into the outer body by a "shrink fit".

BRIEF DESCRIPTION OF THE DRAWING

A more complete understanding of the new control valves and their method of manufacture may be had by reference to the accompanying drawing in which the single FIGURE is a lateral, sectional view of a preferred embodiment of the new control valves.

DESCRIPTION OF THE PREFERRED EMBODIMENTS

Referring in detail to the drawing, the valve 2 comprises an outer body 4 having a cylindrical inlet 6, a cylindrical outlet 8 and a cylindrical central chamber 10 whose diameter is greater than the diameter of the outlet 8. The central chamber joins the inlet 6 to the outlet 8.

The exposed end of inlet 6 is defined by radial flange 12 provided with bolt holes 14 and the exposed end of outlet 8 is defined by radial flange 16 bearing bolt holes 18.

A first tubular sleeve 20 lines the inlet 6 and a second tubular sleeve 22 lines the outlet 8. A third tubular sleeve 24 having a transverse portion 26 defining a valve seat 28 lines the central chamber 10. The valve seat thus is interposed in the flow passage 30 for erosive fluid through the valve 2 defined by tubular sleeves 20, 24 and 22 respectively.

The end 32 of sleeve 24 opposite to the transverse portion 26 has an annulus 34 fitted therein with shoulder 37 thereof bearing upon the radial surface of sleeve end 32.

The valve body 4 includes an enlarged end 36 and the valve bonnet 38 is fastened to the valve end 36 by bolts 40 extending through bolt holes 42 in the bonnet flange 44 and threaded into the bores 46 in the end 36. No gasket is used between the lower face 48 of the bonnet flange 44 and the top surface 49 of the valve end 36.

The valve plug 50 comprises a solid cylindrical body 52 provided at one end with a conical tip 54. The opposite, transverse end 56 has fixed therein a stainless steel insert 58 which has been tapped and threaded to receive the threaded end 60 of the actuator rod 62. The axial portion 64 of bonnet 38 carries a bore 66 and space 68 packed with high temperature resistant packing 70 compressed into the space 68 by gland 72 which threads into the projection 74 on the bonnet portion 64.

The bonnet 38 includes a cavity 76 into which the body 52 of plug 50 may extend when the plug is raised by rod 62 away from the valve seat 28.

The valve plug 50, annulus 34, and sleeves 20, 22 and 24 are all formed of solid chrome carbide or tungsten carbide. Grade "C" tungsten carbide has been found to perform the best against flashing and cavitation enhanced erosion by coke-oven hot-pitch as well as holding up in the corrosive acid conditions inherent with the pitch.

The inner, axial surface 77 of annulus 34 and periphery 78 of the valve plug 50 are sized so that there is snug, sliding engagement between these contacting surfaces. Since the valve plug 50 upstream of the conical tip is of constant diameter and the plug is of such length that the transverse end 56 remains, even in the fully seated position of plug 50, above the top surface 80 of annulus 34, the plug is protected against strain fractures, cracks or the like which have been discovered to develop if valve plugs for the new valves have ledges or other contouring in the portions thereof that are exposed to hot pitch.

The lower annular end 82 of the bonnet 38 extends into the enlarged end 36 of the outer valve body 4 so that the bottom shoulder 86 bears against the gasket 88. The bore 90 in the annular end 82 forms an extension of cavity 76 to provide reciprocation movement space for the body 52 of the valve plug 50.

The actuator rod 62 may be connected to a diaphram actuator (not shown) or any other equivalent unit for reciprocating movement thereof and, in turn, the valve plug 50 in operation of the valve 2.

The success of this invention is due, in part, to the method for construction of the new control valves as described above. The valve outer body 4 is cast of type 316 stainless steel or other corrosion resistant metal having a comparable expansion coefficient and capable of withstanding pressures rated at 600–1500 psi. The sleeves 20, 22 and 24 are cast solid from chrome carbide or tungsten carbide. Cast sleeves are machined to a mirror finish and sized so that the O.D. of the sleeves is slightly larger, e.g., 0.001–0.005 inch, than the I.D. of the respective inlet 6, outlet 8 and chamber 10. The valve body and sleeves are next heated to a temperature where differential expansion of the body and sleeves, e.g., 1000° F., permits the sleeves to be inserted into the respective portion of the body. Then, the assembled parts are allowed to cool to ambient temperatures which causes the sleeves to be locked in place by a shrink fit. This prevents the sleeves from moving in the outer body 4 unless the assembly is again raised to the insertion temperature which, of course, is selected, by suitable oversizing of the tubular sleeves, to be higher than the rated use temperature for the valve.

When the sleeve and body assembly has been cooled to ambient, completion of the valve is accomplished by installing annulus 34 plus gasket 88, inserting valve plug 50 with rod 62 attached, bolting bonnet 38 to body end 36, loading space 68 with packing material 70, e.g., graphite and asbestos, and threading gland 72 into place about the rod 62. The resulting valve may then be installed via flanges 12 and 16 into any flow line handling hot pitch or similar fluid that would rapidly erode control valves of previously available construction.

The embodiments of the invention in which an exclusive property of privilege is claimed are defined as follows:

1. An erosion resistant control valve comprising a steel outer body having a cylindrical inlet, a cylindrical outlet whose longitudinal axis is perpendicular to the longitudinal axis of said inlet, a cylindrical central chamber of diameter greater than the diameter of said outlet joining said inlet to said outlet, a first tubular sleeve lining said inlet, a second tubular sleeve lining said outlet, a third tubular sleeve having a transverse portion defining a valve seat lining said central chamber with said valve seat interposed in the flow passage for erosive fluid through the valve defined by said first, second and third tubular sleeves, a bonnet bolted to said body member opposite to said outlet, an elongated valve plug having a conical end designed to sealingly engage said valve seat, a cylindrical cavity in said bonnet, an actuator rod fixed to said valve plug opposite to said conical end, said rod extending through a packed gland in said bonnet for reciprocation of said valve plug within said cavity into and out of engagement with said valve seat, said first, second and third tubular sleeves and said valve plug being formed entirely of carbide selected from the group consisting of chrome carbide and tungsten carbide, and said first, second and third tubular sleeves being locked in place in said outer body by compression from said outer body.

2. The valve of claim 1 wherein the exposed ends of said inlet and outlet are defined by radial flanges provided with bolt holes.

3. The valve of claim 2 wherein the end of said third sleeve opposite to said transverse portion has a flanged annulus fitted therein through which said valve plug extends with sliding engagement between the periphery of said plug and the inner surface of said annulus.

4. The valve of claim 1 wherein said valve plug is a tungsten carbide cylinder having a conical tip on one end and a stainless steel insert fixed into the opposite end into which said actuator rod is threaded.

* * * * *